United States Patent [19]

Tadakuma et al.

[11] 4,144,567
[45] Mar. 13, 1979

[54] ELECTRONIC CASH REGISTER

[75] Inventors: Yuji Tadakuma; Syunji Saito; Toru Eguchi, all of Ohito, Japan

[73] Assignee: Tokyo Electric Co., Ltd., Tokyo, Japan

[21] Appl. No.: 800,943

[22] Filed: May 26, 1977

[30] Foreign Application Priority Data

May 26, 1976 [JP] Japan .................. 51-60786
Jun. 17, 1976 [JP] Japan .................. 51-71423

[51] Int. Cl.² .................. G06F 7/48; G06F 15/20
[52] U.S. Cl. ........................... 364/405
[58] Field of Search ............. 235/156, 168; 364/404, 364/405

[56] References Cited

U.S. PATENT DOCUMENTS

| | | | |
|---|---|---|---|
| 3,294,960 | 12/1966 | Townsend | 235/160 |
| 3,598,973 | 8/1971 | Brooks et al. | 235/168 |
| 3,944,801 | 3/1976 | Montana | 235/156 |
| 3,946,217 | 3/1976 | Tsujikawa et al. | 235/168 X |
| 3,963,910 | 6/1976 | Enomoto et al. | 235/156 |

Primary Examiner—Jerry Smith
Attorney, Agent, or Firm—Flynn & Frishauf

[57] ABSTRACT

There is provided an electronic cash register comprising a keyboard including a plurality of entry keys and a plurality of transaction keys; a data-storing circuit; a printer; and a data-processing circuit for supplying the data-storing circuit and printer with information represented by operation of keys on the keyboard. The electronic cash register further includes a switch provided to set the operation of the data-processing circuit at the "registration" mode and "tax set" mode. When entry keys are operated with the switch positioned for the "tax set" mode of the data-processing circuit, then desired tax information is stored in a tax memory, and when a tax key included in the transaction keys is depressed after the entry keys are operated with the switch positioned for the "registration" mode of the data-processing circuit, then tax information on a taxable amount stored in the data-storing circuit by operation of the entry keys is read out of the tax memory.

6 Claims, 6 Drawing Figures

ELECTRONIC CASH REGISTER

BACKGROUND OF THE INVENTION

This invention relates to an electronic cash register concurrently designed to provide tax information.

Generally, commodity taxes assessed on articles sold by a supermarket are paid by buyers indirectly through the supermarket to a competent taxation office. In this case, a cashier has personally to figure out tax amount or read a tax amount from a tax table for each transaction, thus rendering tax calculation time-consuming and leading to the registration of an erroneous tax amount.

For resolution of the above-mentioned difficulties, there has been developed an electronic cash register concurrently designed to figure out a tax amount. Such electronic cash register contains a memory stored with a tax table shown, for example, in Table 1 below indicating taxable amounts and assessable taxes.

Table 1

| Tax Table | | | | |
|---|---|---|---|---|
| Taxable Amount | | | | |
| From | | To | | Assessable Taxes |
| $ | ¢ | $ | ¢ | ¢ |
|  | 1 |  | 12 | 0 |
|  | 13 |  | 34 | 1 |
|  | 35 |  | 59 | 2 |
|  | 60 |  | 87 | 3 |
|  | 88 | 1 | 12 | 4 |
| 1 | 13 | 1 | 37 | 5 |
| 1 | 38 | 1 | 62 | 6 |
| 1 | 63 | 1 | 87 | 7 |
| 1 | 88 | 2 | 12 | 8 |
| 2 | 13 | 2 | 37 | 9 |
| 2 | 38 | 2 | 62 | 10 |
| 2 | 63 | 2 | 87 | 11 |

As seen from Table 1 above, taxable amounts ranging from 1¢ to 87¢ are divided into four groups having unequal amount differences. Taxable amounts ranging from 88¢ to 1$ 87¢ are divided into four groups having an equal amount difference of 25¢. Larger taxable amounts are similarly divided into four groups differentiated from each other by the same rate of 25¢. Namely, taxable amount are increased by 1$ for every four groups. Accordingly, assessable taxes are raised by 1¢ for each group of taxable amounts. With Table 1 above, taxable amounts lying between 1¢ and 87¢ are collectively referred to as an unequally differentiated section. Taxable amounts lying between 88¢ and 1$ 87¢ are collectively referred to as a first equally differentiated section. Thus, taxable amounts ranging from N$ 88¢ to (N+1)$ 87¢ are collectively referred to as an equally differentiated section of the (N+1) order.

For calculation of assessable taxes, it is advised to store a memory with data given in Table 1 above, specifically the maximum taxable amount of each group of the unequally differentiated section; an assessable tax on each maximum taxable amount; the maximum taxable amount of each group of the respective equally differentiated sections; a tax assessable on each maximum taxable amount in the equally differentiated section; the maximum taxable amount A (87¢ in this case) of the unequally differentiated section; a number of groups (4 in this case) of which each equally differentiated section is formed; a difference W (1$ in this case) between the amounts of every adjacent equally differentiated sections, and cause a data-processing circuit to carry out upon depression of tax keys an arithmetic operation expressed by the following equation from the contents of the memory:

$$TA - A = C \qquad (1)$$

where TA denotes a taxable amount and C shows the result of an arithmetic operation. Where C represents zero or a negative value, then a tax assessable on the taxable amount TA is determined only from the unequally differentiated section of the tax table of Table 1.

Where C determined by the equation (1) above has a positive value, for example, where TA is 4$ 80¢ and C is 3$ 93¢, then the following equation is used to judge that the corresponding taxable amount belongs to the equally differentiated section of the (N+1) order.

$$(C/W) - 1 \leq N < C/W \qquad (2)$$

Obviously N is a positive integer. The value of N is arrived at by repeatedly subtracting W from C until the result of the subtraction shows a negative value and subtracting 1 from a count denoting how many times the subtraction was carried out. Where C is, for example, 3$ 93¢, then N is 3. Thus a taxable amount of 4$ 80¢ is shown to belong to the fourth equally differentiated section.

A total number of groups E of all the equally differentiated sections lying before that equally differentiated section to which a subject taxable amount belongs can be determined by the following equation:

$$N \times T = E \qquad (3)$$

Since N is 3 and T is 4 in the above-mentioned case, E is 12. As seen from Table 1 above, an assessable tax is increased by 1¢ for each group. Therefore, a tax assessable on a taxable amount $W \times N = 3\$$ is formed to be 12¢.

That portion F of a taxable amount TA whose assessable tax has not been figured out is expressed by the following equation:

$$TA - W \times N = F \qquad (4)$$

Thus F is determined to be 4.80−3=1$ 80¢ which falls within the range set forth in Table 1. Accordingly, a tax G assessable on said 1$ 80¢ is determined to be 7¢ from Table 1. In the above-mentioned case, therefore, a total tax K assessable on the taxable amount TA is determined to be 12+7=19¢.

If provided with a memory stored with data for calculating an assessable tax and an arithmetic operation program, then a cash register can concurrently indicate a total amount of articles sold and a tax assessable thereon.

However, a commodity tax on a taxable amount is subject to change, for example, by amendment of the taxation law. Therefore, a memory has to be stored with fresh data for calculating an assessable tax each time need arises. Consequently, demand has been made to develop an electronic cash register which enables tax-calculating data to be easily stored in a memory each time and can also examine readily whether any fresh tax-calculating data has been correctly stored in the memory. Further in same cases, a prescribed tax rate is applied to a larger taxable amount than a maximum taxable amount (for example, 1$ 87¢) belonging to the first equally differentiated section. Therefore, it has also been desired to develop an electronic cash register concurrently usable with such fixed rate taxation system.

SUMMARY OF THE INVENTION

It is accordingly the object of this invention to provide an electronic cash register which enables tax-calculating data to be easily stored in a memory and can also readily examine whether the data has been correctly stored.

According to an aspect of this invention, there is provided an electronic cash register which comprises a keyboard fitted with a plurality of entry keys and a plurality of transaction keys; first and second memory means; a printer; data-processing means supplying the first memory means, in the tax set mode, with information on the relationship between taxable amounts and taxes assessable on the respective taxable amounts by operation of the entry keys and transaction keys, causing the printer to impress said information on the relationship between the taxable amount and tax assessable thereon, supplying the second memory means, in the registration mode, with information on an amount of sales and a taxable amount thereof, and figuring out a tax assessable on the taxable amount stored in the second memory means from information on the aforesaid relationship between the taxable amount and tax assessable thereon both stored in the first memory; and switching means whose operation is changed over between the first and second positions to set the operation of the data-processing means at a desired mode.

DETAILED DESCRIPTION OF THE INVENTION

Figure 1:
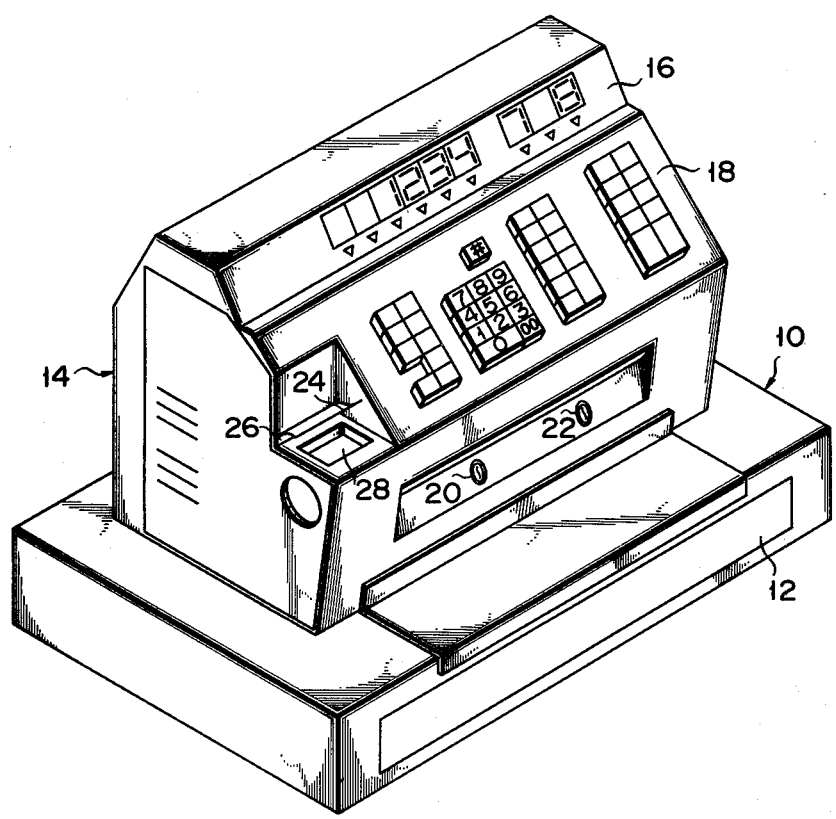
FIG. 1 is an oblique view of an electronic cash register embodying this invention.

FIG. 1 is an oblique view of an electronic cash register embodying this invention. The cash register comprises a box member 10 provided with a drawer 12 and a casing 14 mounted on the box member 10. A display device 16 is set at the top of the casing 14. A keyboard 18 occupies the intermediate section of the casing 14. A main switch 20 and a clerk switch 22 are disposed in the lower portion of the casing 14. Provided adjacent to the keyboard 18 are a receipt outlet 26 from which a receipt 24 is delivered and a window 28 for observing a recorded data on a journal sheet.

Figure 2:
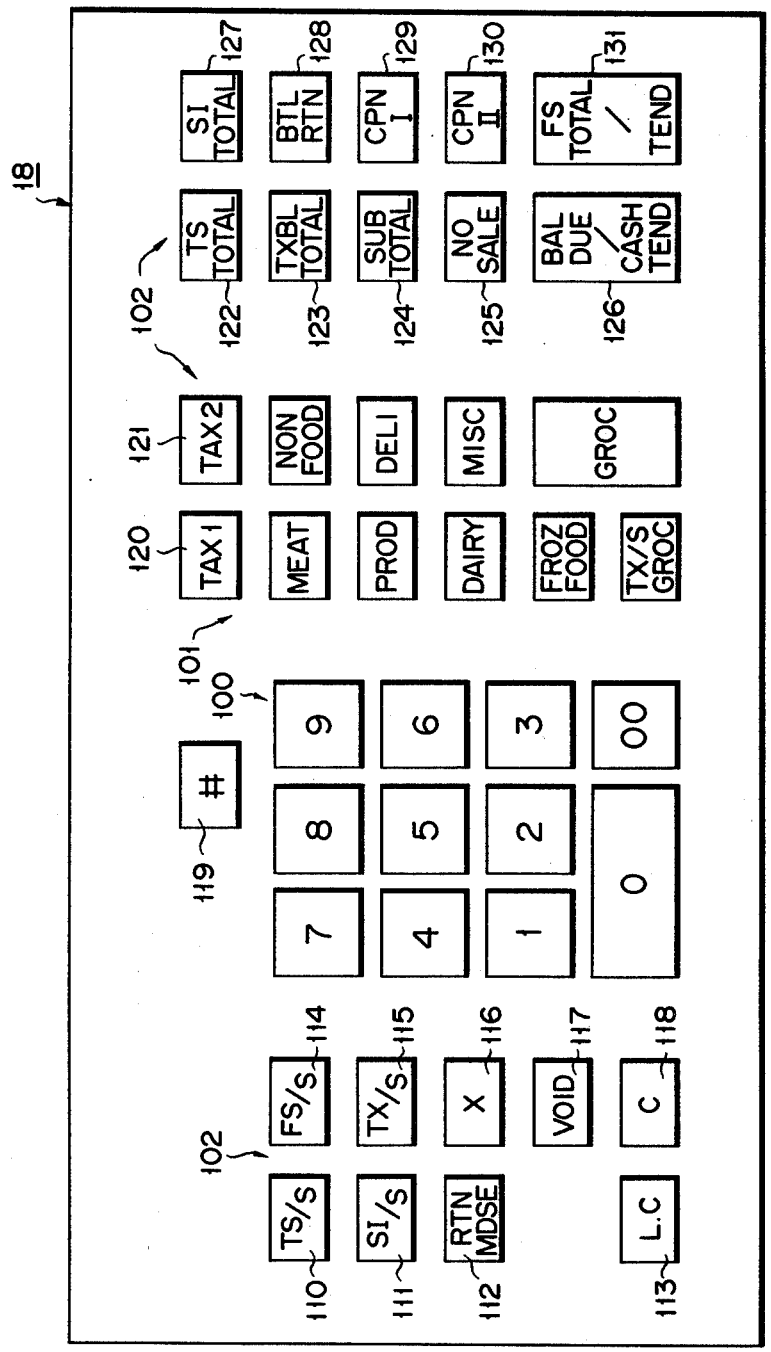
FIG. 2 is a detailed illustration of the keyboard of the cash register of FIG. 1.

As shown in FIG. 2, the keyboard 18 comprises an entry key section 100 for storing an amount of a sold article, a department key section 101 and a transaction key section 102. As is well known, the entry key section 100 is provided with, for example, eleven keys. The department key section 101 is fitted with a plurality of department keys for registering sold articles by sorting them according to their kinds, for example, meat, frozen food, daily necessaries, etc. The transaction key section 102 includes a trade stamp select key 110, selective itemizer select key 111, return merchandise key 112, listing capacity extension key 113, food stamp select key 114, tax select key 115, multiplication key 116, void key 117, clear key 118, number key 119, first and second tax keys 120 and 121, trade stamp total key 122, taxable total key 123, subtotal key 124, no sale key 125, balance due/cash tendered key 126, selective itemizer total key 127, bottle return key 128, coupon keys 129 and 130 and food stamp total/tendered key 131.

The main switch 20 is used to turn on or off a cash register power source and also to set the operation of the electronic circuit of the cash register at the "registration" mode or "tax set" mode as need arises.

In the "registration" mode, amounts of articles bought by a customer are stored in the memory of the electronic circuit to calculate a total amount of all the articles sold. The total amount thus figured out is printed on a receipt and a journal sheet. In the "tax set" mode, tax data showing the relationship between a taxable amount and a tax assessable thereon is stored in a tax data memory by operation of the entry key and tax key.

Figure 3:
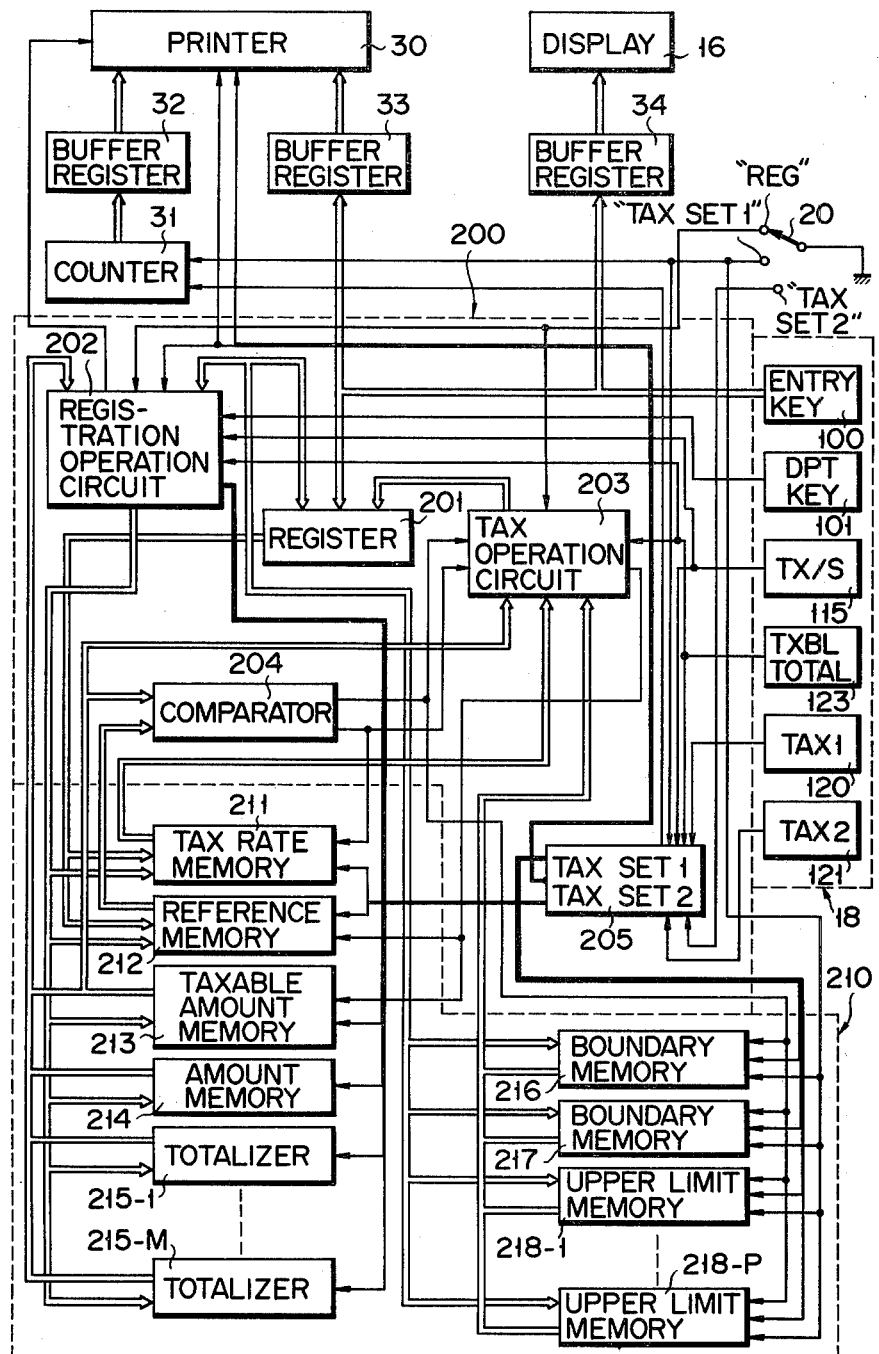
FIG. 3 is a circuit diagram of the cash register of FIG. 1.

FIG. 3 indicates a general arrangement of an electronic circuit including a data-processing circuit 200 and a memory circuit 210, keyboard 18, main switch 20, display device 16 and printer 30.

The data-processing circuit 200 includes a buffer register 201 for storing information obtained by operation of the entry key section 100; a registration arithmetic operation circuit 202 for processing information stored in the buffer register 201 which is obtained by operation of the department key section 101 and transaction key section 102 of the keyboard 18; and a tax-calculating arithmetic operation circuit 203 for processing tax information stored in the memory circuit 210 by operation of the transaction key section 102. The data-processing circuit 200 further includes a comparator 204 for making a comparison between the maximum taxable amount of the unequally differentiated section and a taxable amount stored by operation of the entry key section 100; and a "tax set" mode termination unit 205 for setting the operation of the data-processing circuit 200 through the main switch 20 at the first or second "tax set" mode.

The memory circuit 210 includes a tax rate memory 211 for storing a tax rate applied to a taxable amount exceeding a prescribed level thereby to figure out a tax based on the tax rate; a referential value memory 212 for storing a referential value to a taxable amount; a taxable amount memory 213 for storing a taxable amount; a sales amount memory 214 for storing amounts of articles bought by customer; and totalizers 215-1 to 215-M for storing total amounts of the respective kinds of sold articles. The memory circuit 210 further includes a boundary memory 216 for storing a first boundary value between the unequally differentiated section and the first equally differentiated section, namely, the maximum taxable amount of the unequally differentiated section; a boundary memory 217 storing a second boundary value between the first and second equally differentiated sections, namely, the maximum taxable amount of the first equally differentiated section; and upper limit memories 218-1 to 218-P for storing the maximum taxable amounts of the respective groups of the unequally differentiated section and the maximum taxable amounts of the respective groups of the first equally differentiated section.

Where the data-processing circuit 200 is set at the first "tax set" mode, a counter 31 is operated to calculate a tax assessable on a taxable amount and supplies the counted value to a buffer register 32. This buffer register 32 sends forth stored information to the printer 30. Buffer registers 33 and 34 are stored with information obtained by operation of the entry key section, and supply stored information to the printer 30 and the display device 16.

Figure 4:
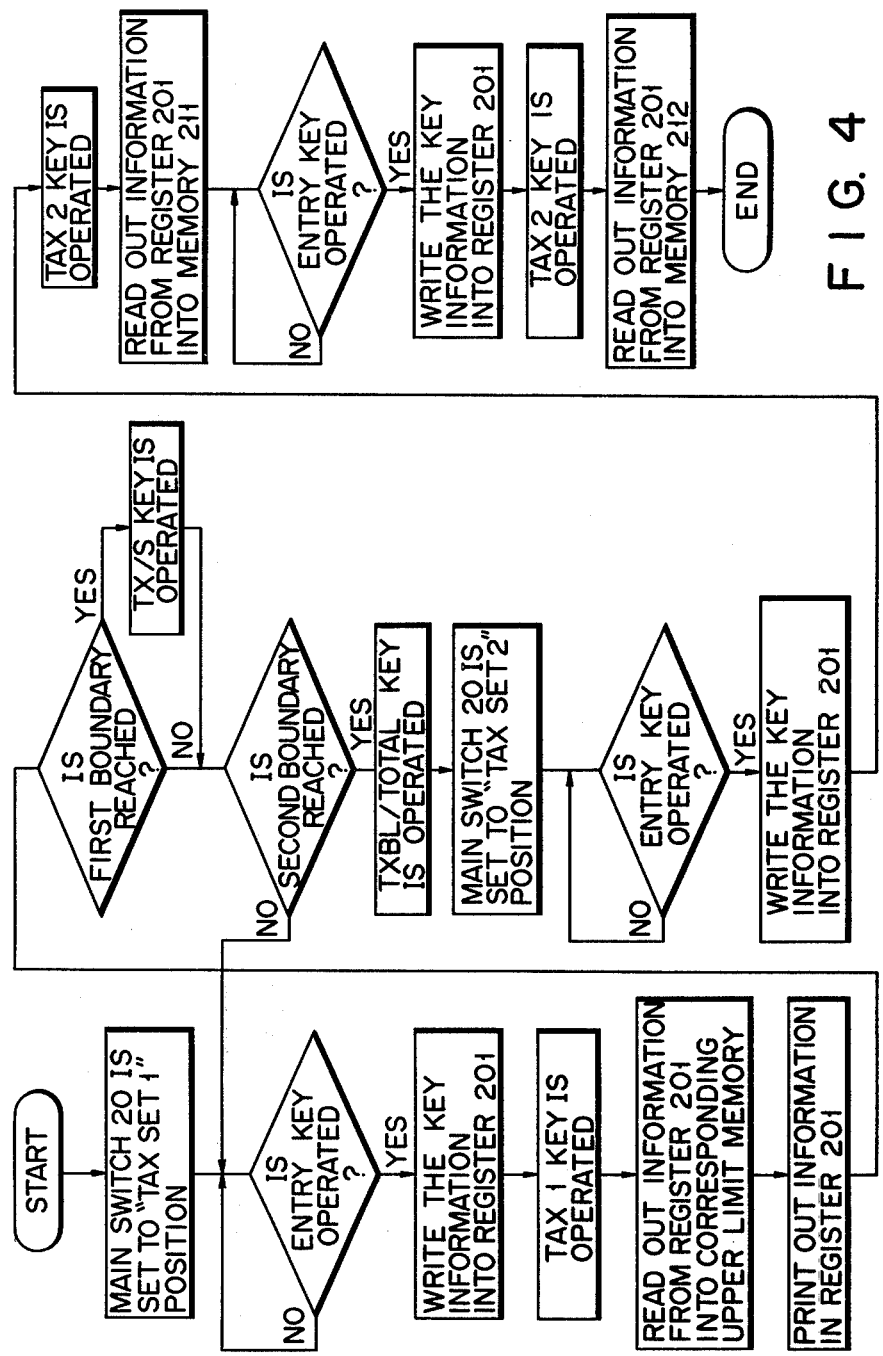
FIG. 4 is a flow chart illustrating the operation of the circuit of FIG. 3 in the "tax set" mode.

There will now be described by reference to the flow chart of FIG. 4 the operation of the electronic cash register of FIG. 3 which is set at the "tax set" mode.

Figure 5:
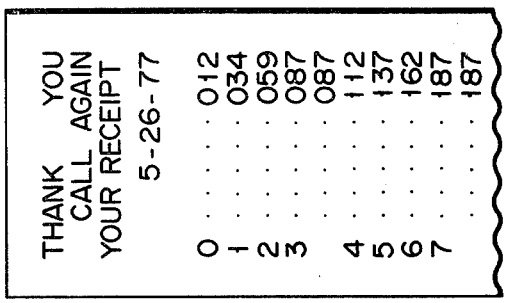
FIG. 5 is a record sheet impressed with a taxable amount and a tax assessable thereon which are stored in the case of the "tax set" mode in a memory used with the circuit of FIG. 3.

First, the main switch 20 is set at the "TAX SET 1" position. Thus, the counter 31 and the boundary memories 216, 217 and the upper limit memories 218-1 to 218-M are cleared. The "tax set" mode determination unit 205 is set at the "TAX SET 1" state, thereby causing the data-processing circuit 200 to be also set at the "TAX SET 1" mode. Where, under the above-mentioned condition, the entry key section 100 is operated to store the upper limit value of the first group of a tax table shown in Table 1, then information obtained by operation of the entry key section 100 is delivered to the display device 16 through the buffer register 34, and also to the buffer registers 33 and 201. Where, at this time, a "tax 1" key 120 is operated, then the contents of the buffer register 201 are conducted to an upper limit memory 218-1 specified by an output signal from the "tax set" mode determination unit 205 in response to the initial operation of the "tax 1" key 120. Thus, the printer 30 is energized by an output signal from the "tax set" mode determination unit 205 in response to the operation of the "tax 1" key 120. As the result, the contents of the buffer registers 32 and 33 are impressed as shown in the uppermost row of the tax table of FIG. 5. Numerals given on the left side of FIG. 5 denote taxes assessable on the maximum taxable amounts of the respective rows of the tax table, which are listed on the right side of FIG. 5 later, the counter 31 counts up from zero to "1" upon receipt of an output signal from the "tax set" mode determination unit 205 in response to the operation of the "tax 1" key 120.

The above-mentioned operation is repeated, causing the maximum taxable amounts of the respective rows of the tax table to be stored in the corresponding upper limit memories. When the boundary value between the unequally differentiated section and the first equally differentiated section, namely, the maximum taxable amount of the unequally differentiated section is stored, then the tax selection key 115 is operated. A memory 216 specified by an output signal from the "tax set" mode determination unit 205 in response to the operation of the tax selection key 115 is stored with the contents of the buffer register 201, namely, the maximum taxable amount of the unequally differentiated section. This maximum taxable amount is impressed on a receipt in the printer 30.

Where the boundary value between the first and second equally differentiated sections, namely, the maximum taxable amount of the first equally differentiated section is stored in the upper limit memory 218-P by repetition of the above-mentioned operation, then the taxable total key 123 is operated. The memory 217 specified by an output signal from the "tax set" mode determination unit 205 in response to operation of the taxable total key 123 is stored with the contents of the buffer register 201, namely, the maximum taxable amount of the first equally differentiated section. Thus, the printer 30 impresses the maximum taxable amount, providing a tax list shown in FIG. 5.

Where tax data is stored for the "TAX SET 2" mode, the switch 20 is first set at the "TAX SET 2" position, causing to "tax set" mode determination unit 205 and also the data-processing unit 200 to be set at the "TAX SET 2" mode. Where, under this condition, the entry key section 100 is operated to store a prescribed tax rate applicable to taxable amounts, then information obtained by operation of the entry key section 100 is supplied to the display device 16 through the buffer register 34 and also to the buffer registers 33 and 201. Later, the contents of the buffer register 201, namely, the prescribed tax rate is stored by the initial operation of the "tax 2" key 121 in the tax rate memory 211 specified by an output signal from the "tax set" mode determination unit 205 in response to the initial operation of the "tax 2" key 121. The printer 30 is energized by an output signal issued from the "tax set" mode determination unit 205 in response to the operation of the "tax 2" key 121, and impresses the contents of the buffer register 32. Where the entry key section 100 is operated to store a referential taxable amount, then information obtained by operation of the entry key section 100 is conducted to the display device 16 through the buffer register 34 and also to the buffer registers 33 and 201. When the "tax 2" key 121 is operated for the second time, then the contents of the buffer register 201, namely, a referential taxable amount is stored in the reference memory 212 specified by an output signal sent forth from the "tax set" mode determination unit 205 in response to the second operation of the "tax 2" key 121. The output signal energizes the printer 30, which in turn impresses or prints out the contents of the buffer register 32. If made larger than, for example, the maximum taxable amount of the unequally differentiated section, then the referential taxable amount would offer great convenience in computing taxes.

Figure 6:
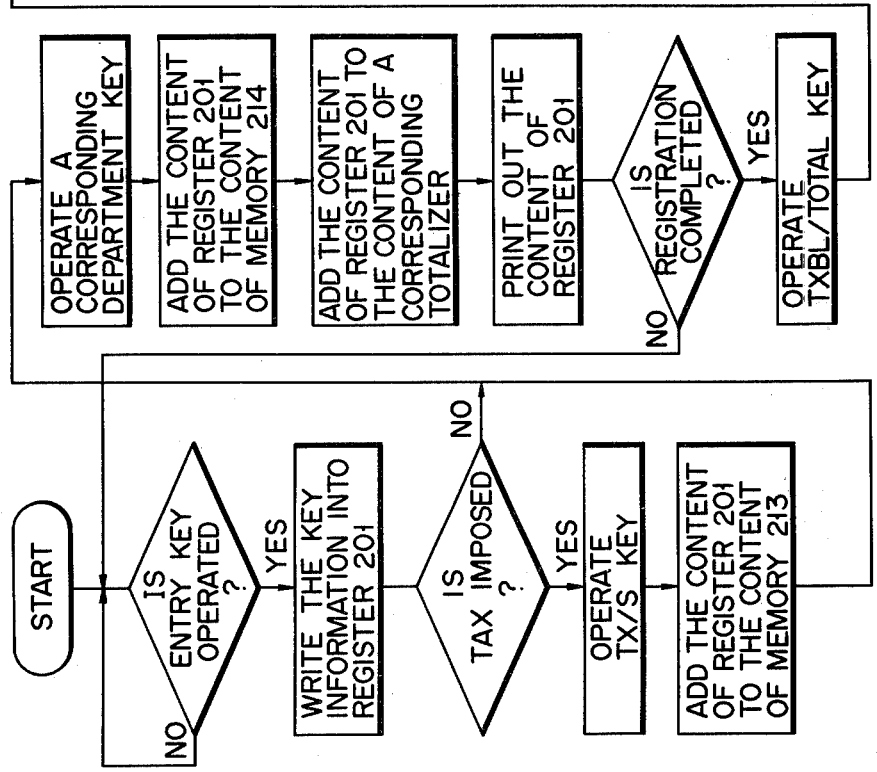
FIG. 6 is a flow chart illustrating the operation of the circuit of FIG. 3 in the registration mode.

There will now be described by reference to the flow chart of FIG. 6 the operation of the cash register circuit of FIG. 3 for the registration mode. The main switch 20 is first set at the "registration" position. At this time, a registration circuit 202 and a tax calculation or operation circuit 203 are operated. Where, under this condition, the entry key section 100 is actuated to register a sales amount, then information obtained by operation of the entry key section 100 is displayed on the display device 16 through the buffer register 34 and is also stored in the buffer registers 33 and 201.

Where an article sold belongs to a taxable category, then the tax selection key 115 is operated. The registration circuit 202 gives a read instruction to a taxable amount memory 213 to read out stored information therefrom, adds together the contents of the buffer register 201 and taxable amount memory 213, and gives a write instruction to the memory 213 to store the result of the addition therein.

Where an article sold falls outside of a taxable category, then the department key section 101 is operated after the entry key section 100 is actuated. Upon operation of the department key section 101, the registration circuit 202 issues a read instruction to a sales amount memory 214 designed to store a total amount of articles sold to a customer, thereby reading stored information therefrom, adds together the contents of the sales amount memory 214 and the contents of the buffer register 201, and writes the result of the addition in the sales amount memory 214. At this time, the registration circuit 202 sends forth a print instruction to the printer 30, which in turn impresses the contents of the buffer register 201. Later, the registration circuit 202 issues a read instruction to one of the totalizers 215-1 to 215-M corresponding to the category of article sold, thereby reading stored information from the totalizer, adds together the information thus read out and the contents of the buffer register 201, and writes the result of the addition in the totalizer.

The above-mentioned operation is repeated until registration for the customer is brought to an end. At the end of the registration, two taxable total key 123 is operated to calculate a tax assessable on a total amount of articles sold.

Initially, when the taxable total key 123 is operated, the registration circuit 202 gives a read instruction to the sales amount memory 214, thereby reading stored information therefrom. The contents of the sales amount memory 214 thus read out are delivered to the buffer register 33 whose contents or a total amount of articles bought by a customer is impressed upon receipt of a print instruction from the registration circuit 202.

The comparator 204 makes a comparison between the contents of the reference memory 212 and those of the taxable amount memory 213. Where the contents of the reference memory 212 denotes an amount equal to or larger than those of the taxable amount memory 213, then the comparator 204 produces an output signal to set the tax calculation circuit 203 at a first tax calculation mode, and issues a read instruction to the boundary memories 216, 217 and upper limit memories 218-1 to 218-P. Conversely were the contents of the taxable amount memory 213 represents a larger amount than those of the reference memory 212, then the comparator 204 sets the tax calculation circuit 203 at a second tax calculation mode, and issues a "read" instruction to the tax rate memory 211.

Where a taxable amount stored in the taxable amount memory 213 has a value smaller than or equal to the contents of the reference memory 212, namely, a referential value previously stored therein, then the tax calculation circuit 203 figures out an assessable tax according to the aforesaid tax table of Table 1 from information stored in the boundary memories 216, 217 and upper limit memories 218-1 to 218-P. Where a taxable amount exceeds the referential value, then the tax calculation circuit 203 computes a tax assessable on a taxable amount by a prescribed tax rate read out from the tax rate memory 211.

A tax thus determined is stored in the buffer register 201 and also in the buffer registers 33 and 34. After calculation of a tax by the tax calculation circuit 203, the registration circuit 202 issues a print instruction to the printer 30, which in turn impresses the contents of the buffer register 33, that is, a calculated tax.

Later, the contents of the buffer memory 33 and those of the sales amount memory 214 are added together. The result of the addition is written in the sales amount memory 214. The contents of the sales amount memory 214 are read out in response to a read instruction from the registration circuit 202. The contents are stored in the buffer register 201 and then in the buffer registers 33 and 34. The printer 30 impresses the contents of the buffer register 33 in response to a print instruction from the registration operation circuit 202.

The foregoing description refers to an electronic cash register according to an embodiment of this invention. However, this invention is not limited to this embodiment. The aforesaid embodiment comprised a combination of memories stored with taxes assessable on taxable amounts included in the unequally differentiated section and equally differentiated sections and also with taxes assessable by prescribed tax rate. However, it is possible to provide memories stored with data on the taxable amounts of the unequally differentiated section and equally differentiated sections, and memories stored with data on the taxable amounts of the unequally differentiated section and tax data based on a prescribed tax rate, and separately operate these memories by actuating the corresponding switches.

Further, if a referential value stored in the reference memory 212 is set at, for example, zero, then it is possible to figure out a tax assessable on a taxable amount by a prescribed rate without the necessity of operating the boundary memories 216, 217 and upper limit memories 218-1 to 218-P. If the referential value is chosen to be considerably large, then, it is possible to calculate taxes from information on the taxable amounts of the unequally differentiated section and equally differentiated section without applying a prescribed tax rate. Further, it should be understood that, in this specification, the term "equally differentiated section" implies not only such a section as shown in Table 1 but also a section in which the difference between the maximum taxable amounts of the adjacent groups is not constant. In this case, however, it is required to set the taxable amounts in the respective groups of each section such that the difference between the maximum taxable amounts of the adjacent groups of the first section is made equal to that between the maximum taxable amounts of the corresponding adjacent groups of the following sections. In the embodiment, four groups are provided in each of the equally and unequally sections, but it is possible to change the number of groups in each of the sections, as required.

Although in the above-mentioned embodiment, a maximum taxable amount is stored in the memories 216, 217, 218-1 to 218-P, a minimum taxable amount may be stored in these memories. In this case, the minimum taxable amounts of the second and (P+1)st groups are stored in the memories 218-1 to 218-P, and the minimum taxable amounts of the first and second equally differentiated sections are stored in the memories 211 and 218.

What we claim is:

1. An electronic cash register comprising:
   a keyboard having a plurality of entry keys and a plurality of transaction keys;
   first and second memory means;
   a printer;
   switching means capable of taking first and second positions; and
   data-processing means coupled to said switching means and being set at a tax set mode when said switching means takes said first position, to store in said first memory means information on the relationship between a taxable amount and a tax assessable thereon each time the entry key section and transaction key section are operated, and to issue a print instruction to said printer in response to the operation of a specified transaction key to cause said printer to print out information on the relationship between the taxable amount and tax assessable thereon, and said data processing means being set at a registration mode when said switching means takes said second position and being responsive to key depression to store in said second memory means information on a sales amount and a taxable amount, and, responsive to operation of a prescribed transaction key, to calculate a tax assessable on the taxable amount stored in said second memory means from information on the relationship between the taxable amount and tax assessable thereon which is stored in said first memory means;

said first memory means including a first memory for storing information on the relationship between data of a taxable amount belonging to an unequally differentiated section and data corresponding to tax assessable thereon, information on the relationship between data on a taxable amount belonging to an equally differentiated section and data corresponding to tax assessable thereon, and a second memory for storing information on a prescribed tax rate;

said second memory means including a third memory into which said data-processing means transfers data corresponding to a referential taxable amount in response to the operation of at least one of said entry keys and a specified one of said function keys; and said data-processing means including a comparator for comparing a registered taxable amount data and said referential taxable amount data stored in said second memory means, and coupled to energize said second memory when said registered taxable amount is larger than said referential taxable amount data, and to energize said first memory when said taxable amount data is not larger than said referential taxable amount data.

2. The electronic cash register according to claim 1 which further comprises a memory for storing information on the maximum taxable amount of said unequally differentiated section.

3. The electronic cash register according to claim 2, which further comprises a memory for storing information on the maximum taxable amount of said equally differentiated section.

4. The electronic cash register according to claim 1, which further comprises a memory for storing information on the minimum taxable amount of said equally differentiated section.

5. The electronic cash register according to claim 4, which further comprises a memory for storing information on the minimum taxable amount of said unequally differentiated section.

6. The electronic cash register according to claim 1, which further comprises a counter coupled to said printer, and wherein said data-processing means issues a print instruction to said printer in response to operation of a specified transaction key to cause said printer to print out information on the relation between a taxable amount belonging to the unequally differentiated section and a tax assessable thereon both stored in said first memory; and said counter is driven to count up upon receipt of an output signal from said data-processing means, said counter being coupled to supply said printer with information on a tax assessable on a taxable amount given in the succeeding row of the tax table.

* * * * *